US012598285B2

(12) United States Patent
Shamir et al.

(10) Patent No.: US 12,598,285 B2
(45) Date of Patent: Apr. 7, 2026

(54) OPTICAL DISPLAY, IMAGE CAPTURING DEVICE AND METHODS WITH VARIABLE DEPTH OF FIELD

(71) Applicant: EVERYSIGHT LTD., Haifa (IL)

(72) Inventors: Hanan Shamir, Haifa (IL); Asaf Ashkenazi, Haifa (IL)

(73) Assignee: EVERYSIGHT LTD., Haifa (IL)

( * ) Notice: Subject to any disclaimer, the term of this patent is extended or adjusted under 35 U.S.C. 154(b) by 0 days.

(21) Appl. No.: 16/978,747

(22) PCT Filed: Mar. 7, 2019

(86) PCT No.: PCT/IL2019/050253
§ 371 (c)(1),
(2) Date: Sep. 7, 2020

(87) PCT Pub. No.: WO2019/171382
PCT Pub. Date: Sep. 12, 2019

(65) Prior Publication Data
US 2021/0051315 A1 Feb. 18, 2021

(30) Foreign Application Priority Data
Mar. 7, 2018 (IL) .......................................... 257946

(51) Int. Cl.
*G09G 5/00* (2006.01)
*G02B 6/04* (2006.01)
(Continued)

(52) U.S. Cl.
CPC ............. *H04N 13/344* (2018.05); *G02B 6/04* (2013.01); *G02B 27/0172* (2013.01);
(Continued)

(58) Field of Classification Search
CPC .... H04N 13/344; H04N 13/324; G06T 7/571; G02B 6/04
(Continued)

(56) References Cited

U.S. PATENT DOCUMENTS 5,581,271 A * 12/1996 Kraemer .............. G02B 27/017
340/980
7,401,920 B1 7/2008 Kranz et al.
(Continued)

FOREIGN PATENT DOCUMENTS

JP H10319240 A 12/1998
JP 2001333438 A 11/2001
(Continued)

OTHER PUBLICATIONS

International Search Report for PCT Application No. PCT/IL2019/050253, mailed on Jun. 27, 2019.
(Continued)

*Primary Examiner* — Jonathan M Blancha
(74) *Attorney, Agent, or Firm* — PEARL COHEN ZEDEK LATZER BARATZ LLP

(57) ABSTRACT

An optical display, suitable for use in a wearable device such as a headset, comprises a pixelated illumination array and a fiber bundle, optionally in the form of a plate. The plate is formed of a plurality of parallel optical fibers extending in the direction of the thickness of the plate, the fibers are of at least two different lengths and are arranged in a spatially sequential pattern over at least a part of the plate, and the array is arranged to provide illumination out of the fibers. Different length fibers may be illuminated to present images at different distances from the user's eyes. The fiber bundle plate may also form part of an image capturing device and be used in the creation of a depth map for a captured image.

18 Claims, 16 Drawing Sheets

(51) Int. Cl.

| | |
|---|---|
| *G02B 27/01* | (2006.01) |
| *G02B 30/40* | (2020.01) |
| *G06T 7/571* | (2017.01) |
| *H04N 9/31* | (2006.01) |
| *H04N 13/324* | (2018.01) |
| *H04N 13/344* | (2018.01) |

(52) U.S. Cl.
 CPC ......... *G02B 27/0179* (2013.01); *G02B 30/40* (2020.01); *G06T 7/571* (2017.01); *H04N 9/3111* (2013.01); *H04N 9/3155* (2013.01); *H04N 9/317* (2013.01); *H04N 13/324* (2018.05); *G02B 2027/0134* (2013.01); *G02B 2027/0138* (2013.01); *G02B 2027/014* (2013.01); *G02B 2027/0178* (2013.01); *G02B 2027/0185* (2013.01); *G02B 2027/0187* (2013.01)

(58) Field of Classification Search
 USPC ........................................................... 345/8
 See application file for complete search history.

(56) References Cited

U.S. PATENT DOCUMENTS

| | | | |
|---|---|---|---|
| 2005/0122479 A1 | 6/2005 | Mann | |
| 2010/0073637 A1* | 3/2010 | Matsumoto | .......... G02B 6/0006 353/30 |

| | | | |
|---|---|---|---|
| 2014/0176862 A1* | 6/2014 | Uehara | ..................... G02B 6/06 349/62 |
| 2014/0333734 A1* | 11/2014 | Yang | ..................... H04N 13/363 348/53 |
| 2015/0235471 A1* | 8/2015 | Schowengerdt | ..... G02B 5/1814 345/633 |
| 2015/0241614 A1* | 8/2015 | Ide | ........................... G02B 6/08 359/204.4 |
| 2016/0157716 A1 | 6/2016 | Pamplona et al. | |
| 2016/0269705 A1* | 9/2016 | Tajima | .............. H04N 5/23229 |
| 2016/0320559 A1* | 11/2016 | Richards | .................. G02B 6/06 |
| 2017/0243373 A1* | 8/2017 | Bevensee | ................. H04N 7/22 |
| 2017/0310889 A1* | 10/2017 | Seibel | ................ A61B 1/00167 |
| 2018/0249906 A1* | 9/2018 | Gramatikov | ......... A61B 3/0025 |

FOREIGN PATENT DOCUMENTS

| | | |
|---|---|---|
| JP | 2003295116 A | 10/2003 |
| WO | WO 2016/135727 | 9/2016 |
| WO | WO 2017/179054 | 10/2017 |

OTHER PUBLICATIONS

Office Action for IL Application No. 257946, mailed on Jan. 16, 2019.
Extended European Search Report for EP Application No. EP19765128. 4, mailed on Nov. 3, 2021.
Rolf R Hainich et al: "NearEye Displays in: Displays: Fundamentals and Applications"; Jul. 5, 2011, CRC Press, Chapter 10, pp. 439-503.

* cited by examiner

401

402

705

Receive eye convergence data from eye
tracking sensors

710

Determine an attention depth for the
user based on eye convergence data

715

Determine which fibers to illuminate
based on the attention depth

Figure 8:
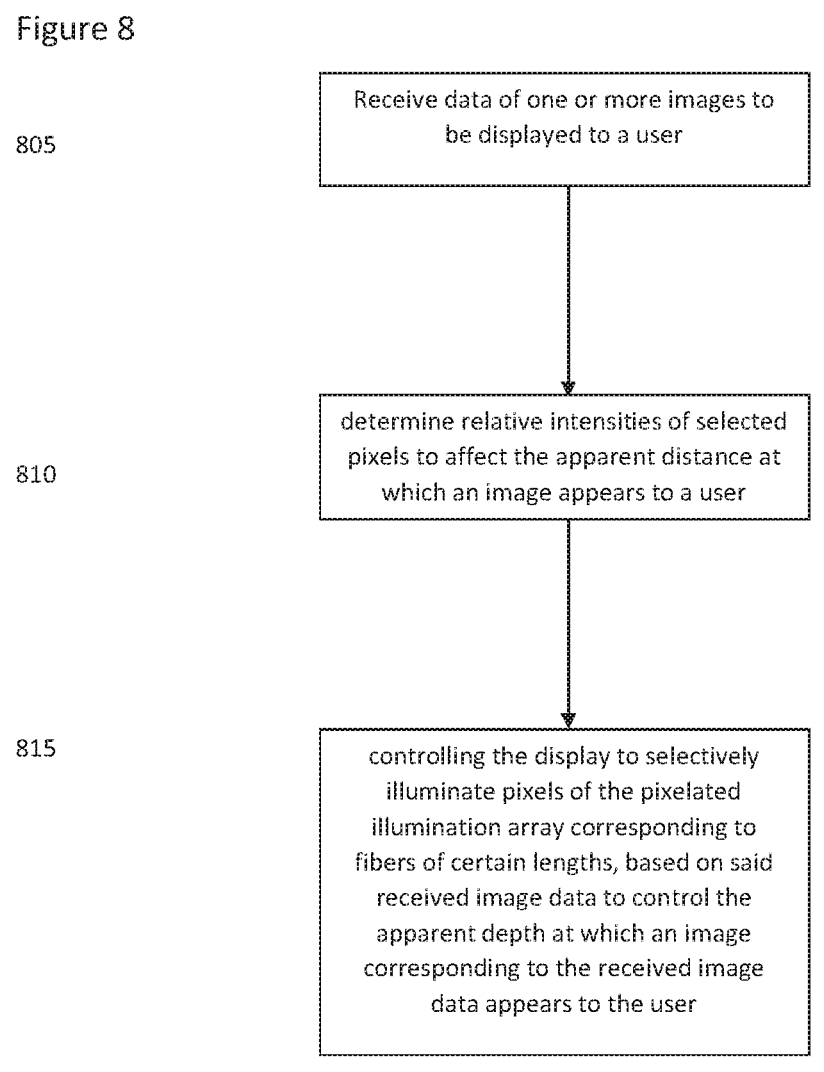

Receive data of one or more images to
be displayed to a user

810 determine relative intensities of selected
pixels to affect the apparent distance at
which an image appears to a user

815 controlling the display to selectively
illuminate pixels of the pixelated
illumination array corresponding to
fibers of certain lengths, based on said
received image data to control the
apparent depth at which an image
corresponding to the received image
data appears to the user

1000

1 meter 2 meter 6 meter 1005    1008    1010    1011    1012    1013

Figure 11

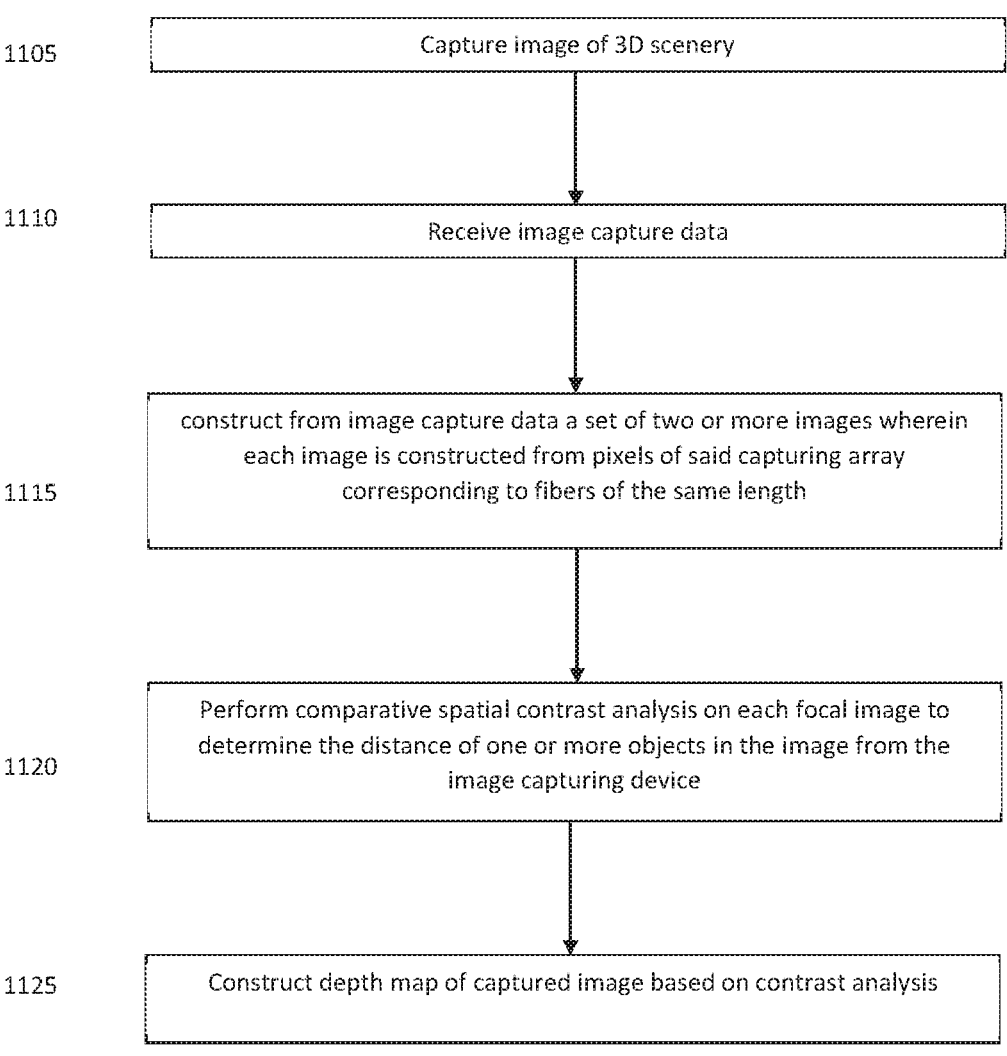

1105 — Capture image of 3D scenery

1110 — Receive image capture data

1115 — construct from image capture data a set of two or more images wherein each image is constructed from pixels of said capturing array corresponding to fibers of the same length 1120 — Perform comparative spatial contrast analysis on each focal image to determine the distance of one or more objects in the image from the image capturing device 1125 — Construct depth map of captured image based on contrast analysis 1205     Receive image data and corresponding depth map 1210     segment of objects in image 1215     determine which pixels to illuminate using the depth map according to the length of fiber corresponding to the pixel

OPTICAL DISPLAY, IMAGE CAPTURING DEVICE AND METHODS WITH VARIABLE DEPTH OF FIELD

CROSS-REFERENCE TO RELATED APPLICATIONS

This application is a National Phase Application of PCT International Application No. PCT/IL2019/050253, International Filing Date Mar. 7, 2019, entitled: "OPTICAL DISPLAY, IMAGE CAPTURING DEVICE AND METHODS WITH VARIABLE DEPTH OF FIELD", Published on Sep. 12, 2019 under PCT International Application Publication No. WO 2019/171382 which claims the priority of Israel Patent Application No. 257946, filed Mar. 7, 2018, which is hereby incorporated by reference in its entirety.

FIELD OF THE INVENTION

The present invention relates generally to the field of optical systems and image capturing devices, for example, for example wearable optical systems that are capable of displaying images, e.g. augmented reality (AR) images to a user and devices for capturing such images.

BACKGROUND OF THE INVENTION

Head-worn optical instruments and devices such as glasses and sunglasses (i.e., eyewear) that incorporate electronic devices are generally known in the art. Examples of such devices include head-mounted displays (HMDs), also known as helmet mounted displays, which are worn on a head of a user and include an image source such as an electronic display that produces an image intended for being directed toward one eye (in the monocular case) or both eyes (in the binocular case) of that user. Another type of a head-worn device is an optical head-mounted display or wearable optical display system which is a see-through HMD that allows the user to both view through it, as well as to view generated images on it.

SUMMARY OF THE INVENTION

Some embodiments of the invention generally relate to displaying different images at different distances to a user wearing a wearable optical display system. Some embodiments of the invention provide an optical display comprising a pixelated illumination image source and a fiber bundle, which may be in the form of a plate. The bundle may be formed of a plurality of parallel optical fibers extending from the source, for example in the direction of the thickness of the plate, and the fibers may be of at least two different lengths are arranged in a spatially sequential pattern over at least a part of the bundle. The array may be arranged to provide illumination out of the fibers. By selectively illuminating the fibers images may appear to be at different distances from the eye of a user.

Some embodiments of the invention provide a wearable optical display system comprising the optical display, a method of dynamically determining the distance at which an optical display system focuses information to be projected to a user, a method of displaying images, a method of capturing images, and an image capturing device.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIG. 8 is a flow chart depicting a method of displaying an image to a user according to some embodiments of the invention;

FIG. 11 is a flow chart depicting a method of capturing images according to some embodiments of the invention;

DETAILED DESCRIPTION OF THE INVENTION

Figure 1A:
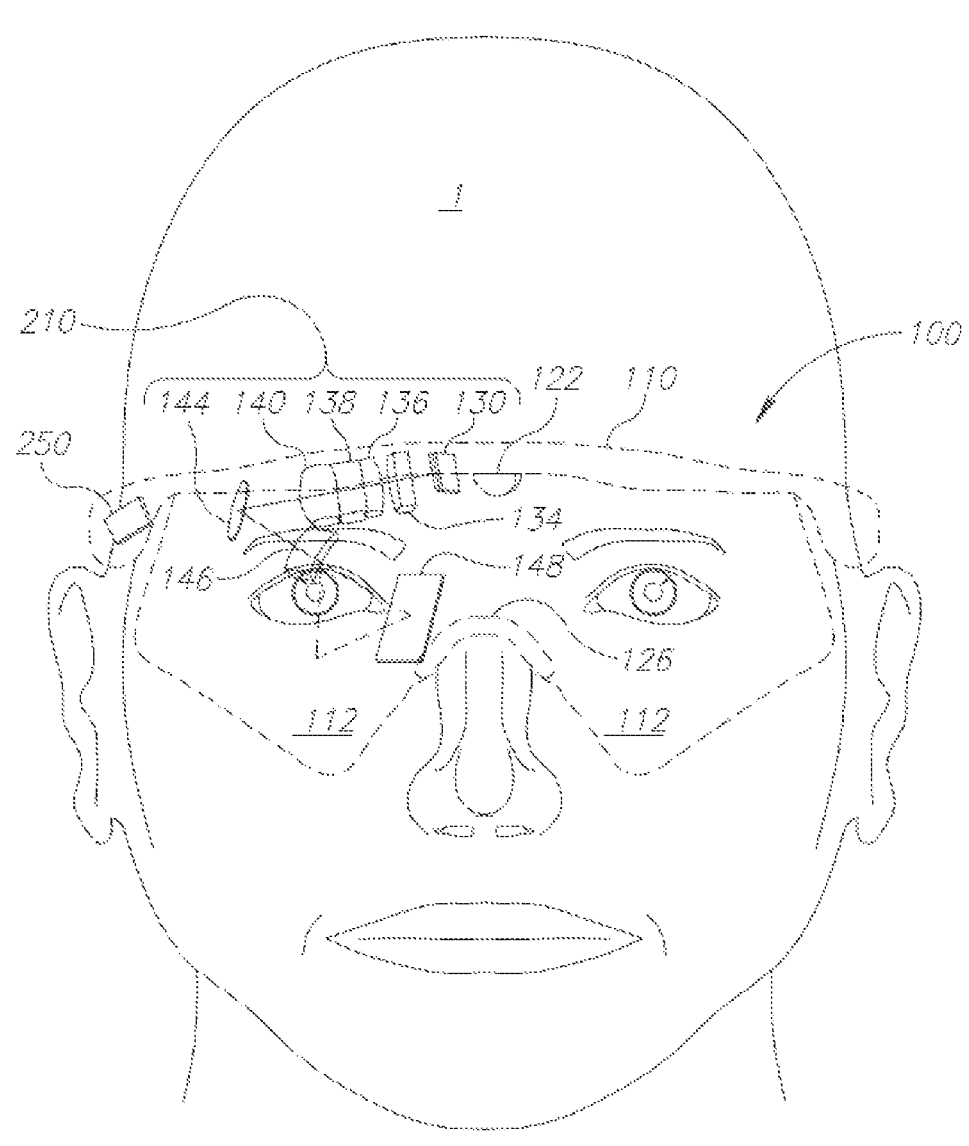
FIGS. 1A and 1B show respectively a front view and a side view of a headset, as worn by a user, according to some embodiments of the invention.

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

The term 'user' as used herein unless otherwise stated may refer to a wearer, or carrier, of a headset from which data may be received and analysed, or to a user to whom information may be displayed. The latter may be wearing a headset according to some embodiments of the invention, or not according to others. The terms "HMD", "headset" and "wearable optical display system" are used herein interchangeably unless otherwise stated. Terms such as "forward" and "rear" used herein refer to the direction of travel of light unless otherwise stated.

Some embodiments of the invention may provide a fiber bundle plate and some embodiments of the invention provide a display including a fiber bundle plate. The display may be used in a headset or other wearable optical display system, for example to provide an augmented reality "AR" experience to a user. For example, a user may wear a headset which in one mode of operation permits a normal view of a scene as would be visible without the headset and which in another mode of operation displays to a user additional information, for example overlaid on the normal view. The headset may be in the form of goggles or glasses or may take any other form that may be worn on the head of a user. A headset according to some embodiments of the invention is described with reference to FIGS. 1A, 1B, 2 and 3. A HMD suitable for use in some embodiments of the invention is disclosed in international patent application WO2016/135727 A1. The HMD of FIGS. 2A, 2B and 2C is described in more detail in international patent application WO 2017/179054A1.

Figure 1B:
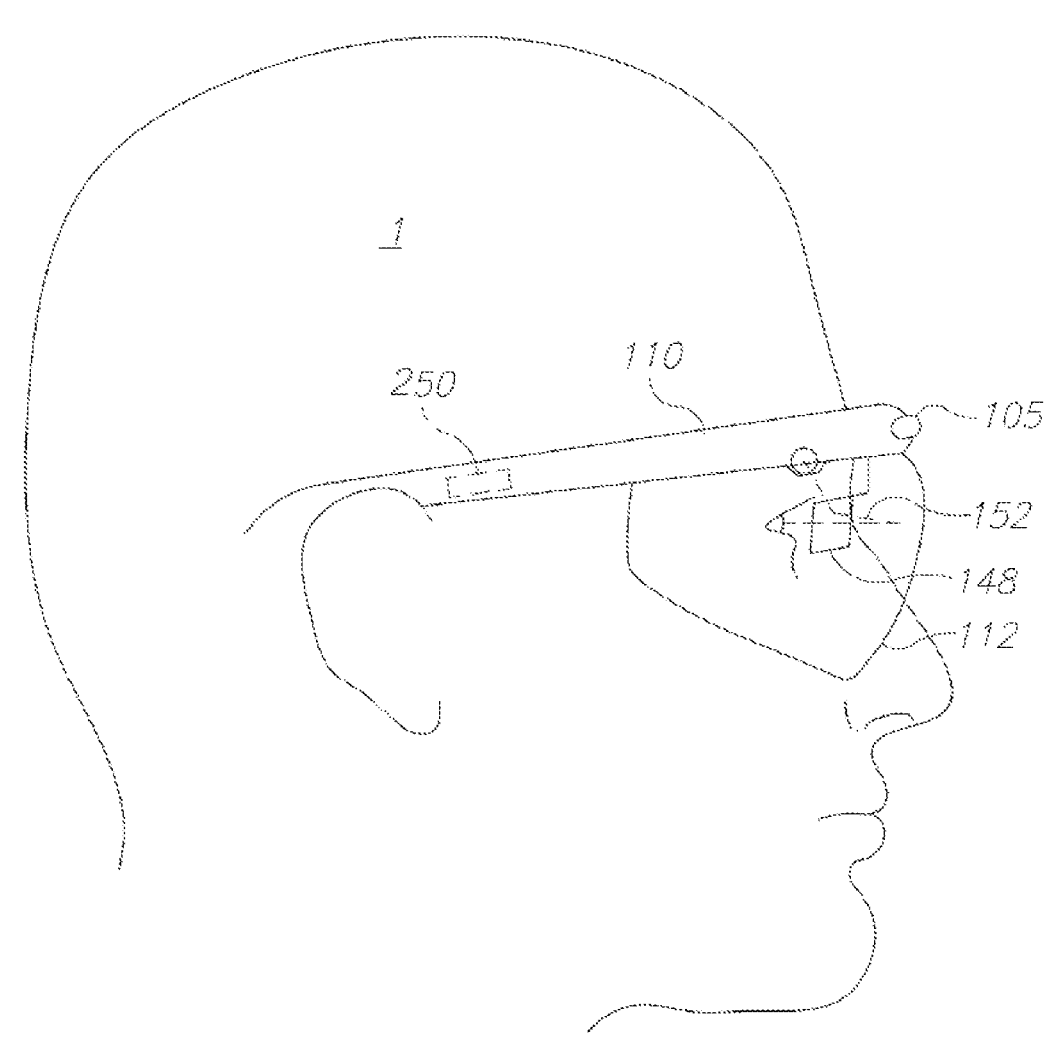
Figure 2:
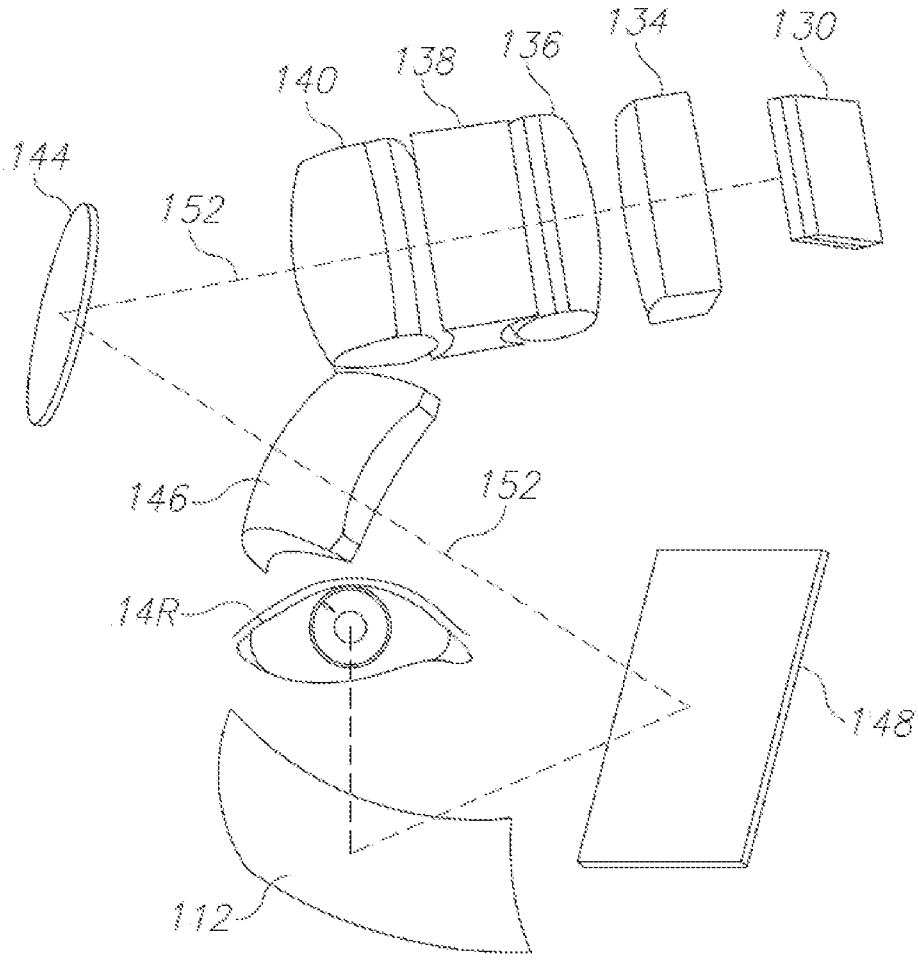
FIG. 2 is an exploded view of an optical display system of the headset of FIGS. 1A and 1B, according to some embodiments of the invention.

FIG. 1 illustrates a headset 100 according to some embodiments of the invention. FIG. 1A is front view of a headset 100 according to some embodiments of the invention mounted on the head of a user 1. The headset 100 is in the form of a wearable eyewear (e.g. glasses, spectacles etc.) including user attachment section 110, partially transmissive partially reflective optical part 112 and display 130 including a fiber bundle plate according to some embodiments of the invention. User attachment section 110 may include a touch sensitive portion, not shown, for user input or the headset may include some other user input device. Furthermore, FIG. 1B illustrates the headset 100 of FIG. 1 from a side view mounted on the head of a user 1.

The headset includes a display 130, lenses 134, 136, 138, 140, and 146, and reflectors, e.g. mirrors, 144 and 148 forming an optical arrangement for displaying one or more images in front of one eye of a user. A framework (not shown) is configured and operative to precisely position the various optical components in precise relative positions and orientations with respect to each other. Altogether, these components may form an optical display system 210 that is operative to project imagery (e.g., images, video, graphical representations, etc.) onto partially transmissive partially reflective optical part 112 that is superimposed or overlaid onto the center of the user's field of view (FOV) while keeping the user's field of regard (FOR) intact without the introduction of obstructions (e.g. non-optical structural elements), or distortions. The optical display system 210 is shown in exploded view in FIG. 2. Headsets according to some embodiments of the invention may include a display for each eye and/or an optical arrangement for displaying one or more images in front of each eye of the user.

The headset 100 further comprises an image capturing device such as a camera 105, eye tracking sensors 122, and electronic control unit 250 described in more detail with reference to FIG. 3. Mirror 148 is shown positioned near to the nose of the user 1. In other headsets, a different mirror arrangement may be used with reflectors in other arrangements away from the user's nose.

Figure 3:
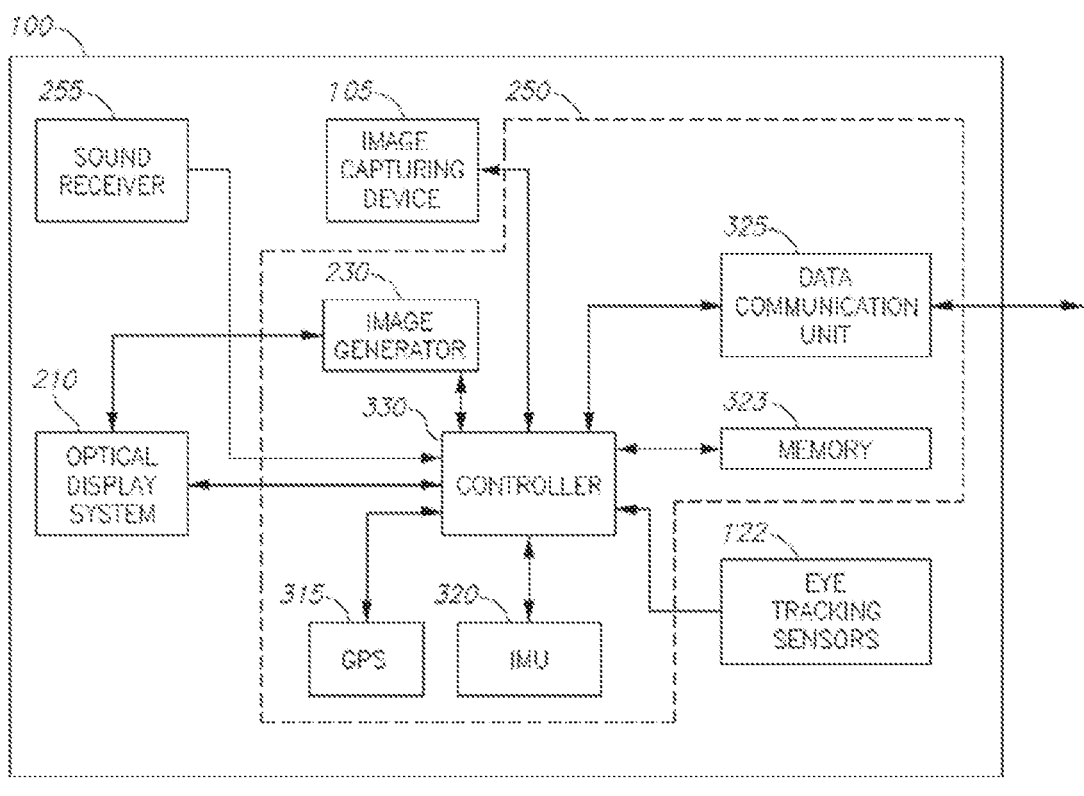
FIG. 3 is a schematic diagram showing components that may be comprised in a headset according to some embodiments of the invention.

FIG. 3 is a block diagram of components that may be comprised in a headset 100 according to some embodiments of the invention. Some of the components may be the same as in headsets known in the art, configured to operate according to embodiments of the invention.

It should also be noted that it is not a requirement for embodiments of the invention, unless otherwise stated herein, for the components shown in FIG. 3 to be part of a HMD. In some embodiments of the invention the components may be distributed about the user in various ways as appropriate to the function of the component for example but not limited to in pockets, in peripheral devices such as mobile phones, attached to or embedded in clothing, attached to or embedded in parts of the body other than the head. Thus, the components shown in FIG. 3 are generally referred to as "user equipment" and the term "user equipment" may refer to one or more components, for example as shown in FIG. 3, carried by, embedded in, worn by or attached to a user.

In FIG. 3, a headset 100 may comprise at least one image capturing device 105, or image sensor, such as a CCD array, capable of capturing still or video images. Image capturing device may have a wide FOV for example a 360° camera array or other wide FOV image capturing device or it may have a narrower FOV. The headset 100 may further comprise an optical display system 210 including display 130 of FIGS. 1A and 1B, examples of which are described in more detail with reference to FIG. 4, which may be a wide FOV display. The headset may further comprise a global positioning system "GPS" unit or other position sensor 315, an inertial measurement unit "IMU" or orientation sensor 320 which may for example output line of sight "LOS" measurements as is known in the art, eye tracking sensors 122 which may for example detect eye movements and output signals relating to eye position and rotation, sound receiver 255 such as but not limited to a microphone, memory 323, a data communication unit 325 and a controller 330. The controller 330 may include one or more processors that may process input data and control operation of the optical display system 210 including display 130 as described further herein. The headset may further comprise an image generator 230 which may be arranged to generate images under the control of controller 330 to output image data to be displayed by a display in the optical display system 210. According to some embodiments of the invention the image generator may be part of the controller 330 and its operations are not therefore described separately herein.

Eye tracking sensors are known in the art and any suitable eye tracking sensor, or pair of sensors, may be used in some embodiments of the invention. One example of a system for eye tracking is shown in U.S. Pat. No. 7,401,920 B1 and a system of this type may be used in some embodiments of the invention. Other suitable systems may be used and will be familiar to those skilled in the art.

Some or all of the components shown in FIG. 3 may be comprised in an electronic control unit 250 which may be mounted on or housed in the user attachment section 110 of a headset (FIGS. 1A and 1B). In the embodiment of FIG. 3, only some components are shown to be comprised in an electronic control unit 250.

In all embodiments of the invention unless otherwise stated the image capturing device may include a collection of individual image capturing devices arranged around a user's body, for example around or on top of his head, optionally as part of a headset, on the shoulder of the user or at any other location.

Figure 4A:
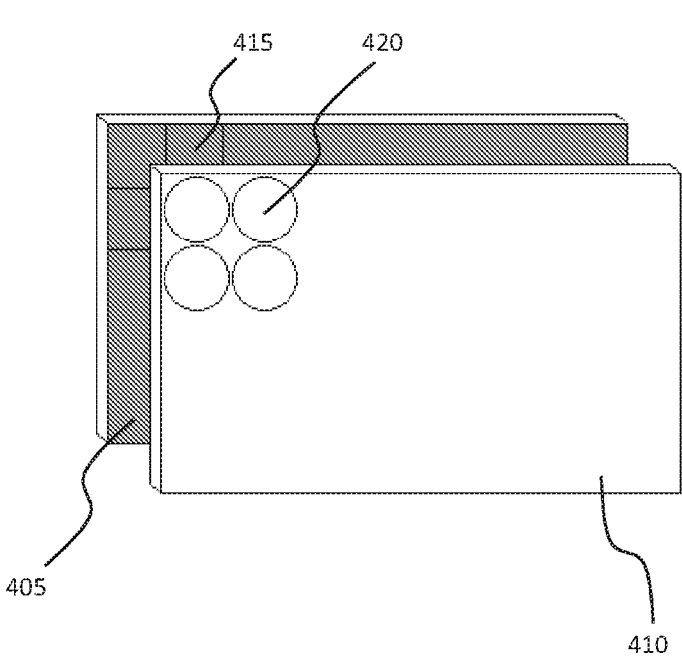
FIGS. 4A and 4B each show an exploded schematic view of a display suitable for use in a headset according to some embodiments of the invention.

FIG. 4A illustrates schematically an exploded view of a display 401 according to some embodiments of the invention, suitable for use in the headset of FIG. 1. The display 401 may be an embodiment of display 130 and may comprise a pixelated illumination image source and a transmissive plate. In some embodiments, the pixelated illumination image source may comprise a cathode ray tube or other raster-type illumination image source as is known in the art. In other embodiments, for example as shown in the figures, the pixelated illumination image source may comprise an array, such as an array of liquid crystals (LCD), light emitting diodes (LEDs) or organic LEDs (OLEDs). In all embodiments of the invention described herein, unless otherwise stated an illumination array could be replaced by any other kind of pixelated illumination image source. The display 401 is shown to comprise a pixelated illumination image source in the form of an array 405, and a transmissive plate in the form of fiber bundle plate 410. The pixelated illumination array 405 may be arranged to illuminate the fibers of the fiber bundle plate individually, or to illuminate fibers of the same length separately from fibers of other lengths. Embodiments of the invention are not limited to the fibers being provided in the form of a plate and some embodiments of the invention may include one or more fiber bundles in other forms. It should also be noted that two or more fiber bundle plates may be provided according to some embodiments of the invention. Each fiber bundle plate may include fibers of more than one length.

The pixelated illumination array 405 may receive an input from an external source (not shown, e.g., a digital media player, a data storage device, peripheral devices, a computer network (e.g., Internet), etc.). The external source may be the image capturing device 105 that sends signals to the controller 330 which may convey these to the optical display system 210. According to one mode of operation, one or more processors within controller 330 may at least partially encode received data into light encoded data (i.e., light containing information) (also denoted herein interchangeably as "light encoded information" or "light-encoded information"), and control the display 130 to project the light-encoded information in the form of a light representation (e.g., an image, graphical information, symbology, etc.) partially created from the received data.

Figure 4B:
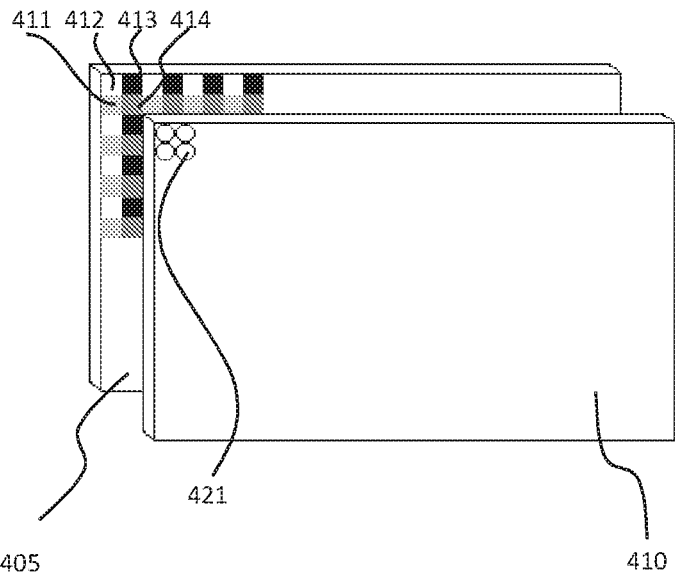

The pixelated illumination array 405 is configured to transmit light via the fiber bundle plate 410. Fiber bundle plates are known in the art and are formed of a plurality of parallel optical fibers extending in the direction of the thickness t of the plate. The fibers may be cylindrical or of other non-tessellating shapes and the interstices between fibers may contain filler material. In FIGS. 4A and 4B the fiber bundle plate is illustrated schematically and only the forward ends of the fibers are indicated. The fiber bundle plate 410 may transmit the light from the pixelated illumination array 405, via the fibers 420 to present imagery to the user.

The fibers in this illustrated embodiment are arranged such that the first ends of the fibers are aligned whereby one surface of the plate is flat and the second ends of the fibers are offset as a result of said difference in length. The flat surface of the plate faces towards the pixelated illumination array 405. The fibers and pixels may be aligned such that there is at least one pixel of the array 405 per fiber of the fiber bundle plate 410. Thus, each fiber may be illuminated separately. In some embodiments of the invention, shown in FIG. 4A, the pixels 415 and fibers 420 may be aligned in a one-to-one arrangement. For example, the pixel size may be equivalent to the fiber diameter, for example with rectangular or square pixels arrangement the fiber diameter may be equal to the pixel depth or width. As explained in more detail with reference to FIG. 5, a fiber bundle plate according to some embodiments of the invention may be used to present, to a user, a plurality of images such as augmented reality elements that are generated from the same point of origin, appearing at varying distances relative to the user, e.g. the eye of the user.

In other embodiments of the invention, the pixels of the array may each comprise a plurality of sub-pixels, for example each sub-pixel may be arranged to project light of a different color. The fibers and pixels may then be aligned such that there is at least one sub-pixel per fiber of the fiber bundle plate 410. This may be achieved through the use of an illumination source for each sub-pixel or through the use of a suitable filter arrangement as is known in the art of image displays. In a particular example, shown in FIG. 4B, the pixels of the display 405, an embodiment of display 130, may be comprised of four-sub pixels (411, 412, 413, 414). Three of these sub-pixels may be configured to emit light of a primary colour, whilst the fourth may emit white light. Furthermore, the size of the fibers 421 may be reduced as compared to the arrangement of FIG. 4A so that the sub-pixels and fibers are aligned in a one-to-one arrangement. In an arrangement where more than one fiber per pixel is provided, the fibers corresponding to each pixel may be of the same length and different from the length of fibers corresponding to at least some other pixels. For example, the four fibers 411, 412, 413, 414 may be of the same length. Alternatively, the fibers corresponding to each pixel may be of different lengths. It will be appreciated that other arrangements of pixel and fiber are possible according to embodiments of the invention.

Figure 5A:
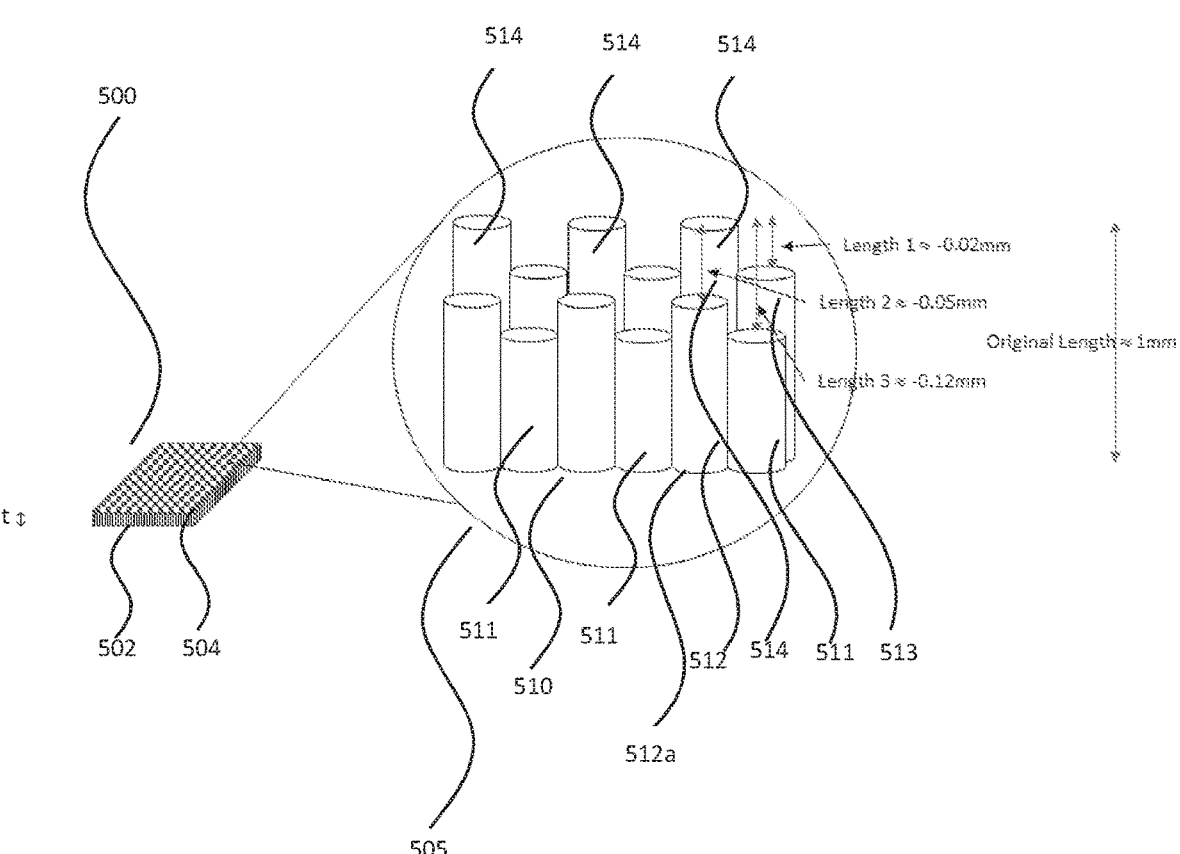
FIGS. 5A and 5B are schematic illustrations of fiber bundle plates each with different spatially sequential patterns of fibers according to some embodiments of the invention.

FIG. 5A is a schematic illustration of a fiber bundle plate 500, which may be an embodiment of plate 410, with a plurality of fibers 510 in the direction of the thickness t of the plate. The plate 500 may be arranged with respect to an illumination array such that the direction of light transmission is from the rear surface 502 to the front surface 504. The circle 505 is an enlarged view of a portion of the fiber bundle plate 500, comprising fibers of varying lengths 511, 512, 513, 514.

In general, the back surface 502 of the plate 500 may be flat and thus the first or rear ends of the fibers, for instance 512*a* of the fiber 512, are aligned. The fibers extend outwards towards a front surface 504 of the plate where the second ends of the fibers are not aligned. In this example there are fibers of four different lengths arranged in groups of four with the different length fibers in an identical spatial arrangement, or pattern, in each group to form a spatially sequential pattern, e.g. a pattern that is repeated from one group to the next.

Embodiments of the invention are not limited in terms of lengths of the fibers and the difference in length between the fibers. According to some embodiments of the invention, the fibers may be longer or shorter than a nominal length. For example, the nominal length may be between 1 mm and 3 mm with a variation of +/−0.6 mm. In another example the length of the fibers may be between 1 and 0.88 mm. The nominal length may depend on physical constraints needed to maintain the structural integrity of the fiber bundle plate.

In general, the fibers extending from the plate 500 will be of at least two different lengths. In some embodiments, the number of different lengths of fibers is three or more. The variation in fiber length may be such that the fibers are offset in groupings of two or more. According to some embodiments of the invention, a repeating pattern of these fiber groupings may be formed uniformly across the plate resulting a spatially sequential pattern. The spatially sequential pattern may be present over the whole or part of the fiber bundle plate. In the illustrated arrangement the fibers of the fiber bundle plate are arranged in groups, each comprising a fiber of each different length. Thus, according to some embodiments of the invention the fibers may be arranged in groups with the groups being adjacent to each other, each group containing the same number of fibers of the same different length arranged in the same pattern.

This variation in the length of the optical fibers across the fiber bundle plate 500 may create different optical path lengths for the different fiber lengths. For example, the shortest fibers 511 may be located with their forward ends, or the ends shown uppermost in FIGS. 5A and 5B, at the back focal plane of the optical arrangement comprising lenses 134, 136, 138, 140, and 146, and reflectors, e.g. mirrors, 144 and 148. Then an image displayed using only those fibers will be projected through the optical arrangement to appear at infinity to the user. In such an arrangement the longest fibers 514 will have their forward ends closer to the optical arrangement, e.g. closer to lens 134, and therefore an image displayed using only the longest fibers 514 will appear closer to the user.

In some embodiments, the structure of the optical display system 210, for example the plurality of lenses, may affect the eventual rendering of the images to the user wearing the headset 100. An offset between fibers of the plate of a fraction of a millimetre may result in an apparent difference in distance of several meters between rendered images seen from the user's perspective. Thus, the variations in distance that are apparent to a user may directly result from the physical structure of the display 130 of the headset, specifically, the series of lenses as depicted in FIG. 3.

In some embodiments, the shorter length fibers may be illuminated in one region of the plate whilst the longer fibers may be illuminated in another region of the plate by the pixelated illumination array, e.g. LED array. For example, in one or more clusters of pixels only the fibers of one length may be illuminated and in one or more other clusters of pixels only the fibers of a different length may be illuminated. As explained previously, such an arrangement may for example allow one displayed object to appear in the immediate vicinity of the user whilst another will appear several meters away. The objects projected may be the same size in real life but once rendered, the images may appear to be different sizes due to their relative distance apparent to the user. In a one to one arrangement of pixels and fibers, it will be appreciated that if only a selection of the fibers is illuminated to display an image then the resolution of the image will be degraded as compared to all of the fibers being illuminated. To take the example of four different length fibers, a 1:4 reduction of resolution with currently available LED arrays is generally acceptable to the human eye. Thinner optical fibers continue to be developed and therefore it is anticipated that it will be possible to display images using embodiments of the invention at a resolution comparable to currently available LED arrays. Additionally, smaller pixels within an OLED display are being developed and it is anticipated that these may eventually be half the pitch of existing OLED displays.

Figure 5B:
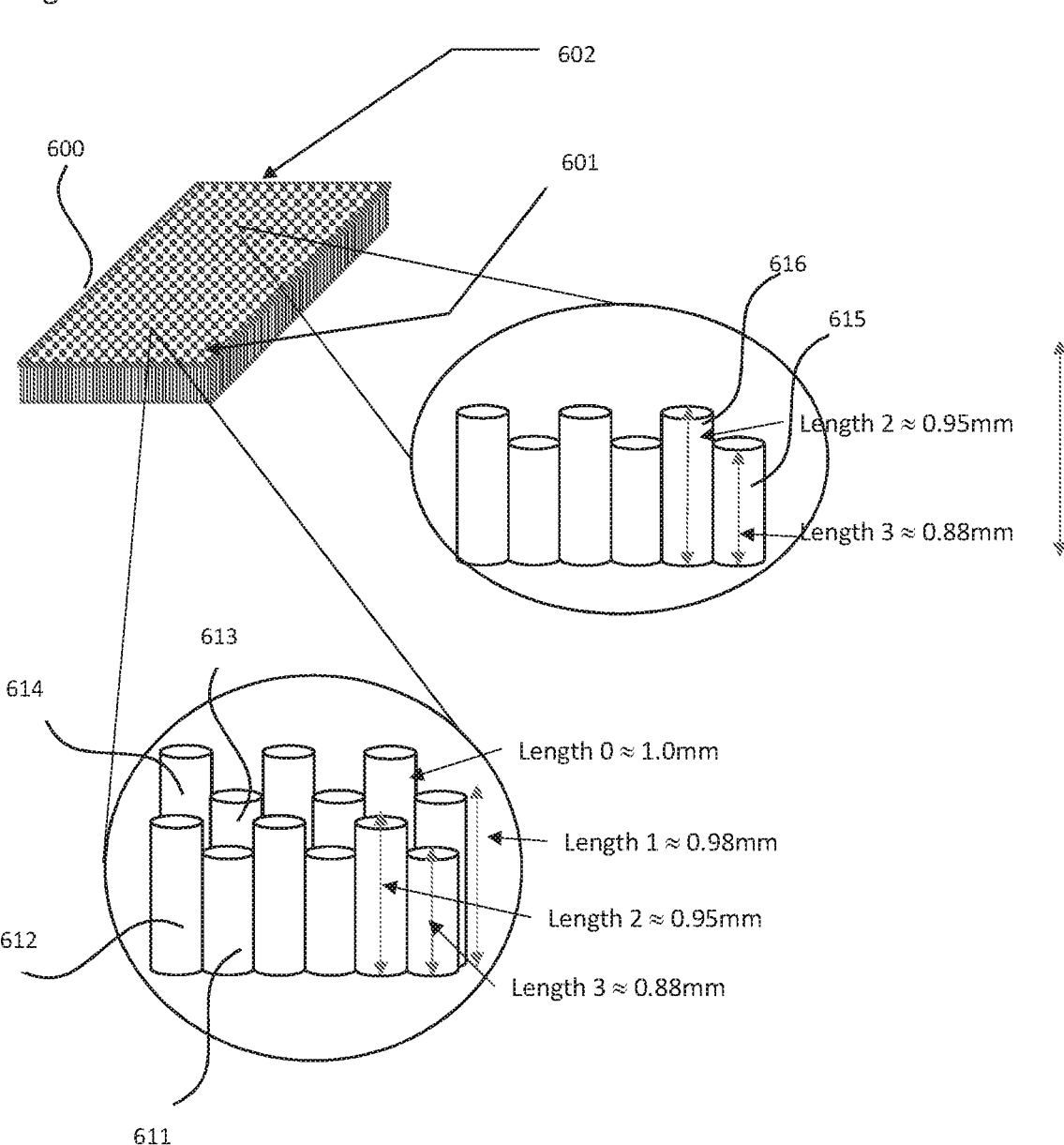

FIG. 5B illustrates schematically an alternative fiber bundle plate 600 comprising two different spatially sequential patterns of fibers extending from the plate 500 according to some embodiments of the invention. The fibers of different lengths may be arranged such that one spatially sequential pattern may be formed in a first region of the plate and another different pattern may be formed in a second region of the plate, according to some embodiments of the invention. This may be useful for drawing the focus of the user to projected imagery. For example, different spatially sequential patterns may be used to draw the eye towards the center of the user's FOV. Thus the fiber bundle plate may comprise a first spatially sequential pattern of fibers in a first region adjacent to one edge and a second spatially sequential pattern of fibers in a second region adjacent to the opposite edge. The two regions may be adjacent to each other, or the two patterns may merge at a central region, or additional spatially sequential patterns of fibers may be included. According to some embodiments of the invention, the first region may correspond to the inner part of the field of view of one eye of the user (towards the nose) and the second region may correspond to the outer part of the field of view of the eye (towards the ear). The first spatially sequential pattern may contain fewer different lengths of fiber than the second spatially sequential pattern.

In the fiber bundle plate 600, at an area 601, at which the pixels may be projected to the inner angular range of the field of view of the user (e.g. the eyes converge in order to look at those pixels—20 degrees to +5 degrees), the fiber bundle plate may consist of a first number of lengths of fibers, for example four lengths 611, 612, 613, 614. Suitable dimensions may be but are not limited to lengths starting from 1 mm, 0.98 mm, 0.95 mm to 0.88 mm, enabling projection at four distances, for example 0.5, 1, 2 and 6 meters away.

At a second area 602, at which pixels may be projected to the outer angular range of the field of view of the user (e.g. +5 degrees to +40 degrees), the fiber bundle plate 600 may consist of a second smaller number of lengths of fibers, 0.95 mm and 0.88 mm, enabling projection at two distances 2 and 6 meters away.

A person skilled in the art will appreciate that a user trying to concentrate on an object will rotate his/her head towards the object, in order for the object to be positioned at the center of the user's field of view. Then focusing at a near object typically requires the eyes to converge. Looking at relatively distant objects, the eyes diverge tending to be oriented relatively parallel.

In other embodiments of the invention, regions of the plate in which the spatially sequential patterns of fibers are different may be defined in any suitable way. One possibility is to for a central region of the plate to have a different pattern of fibers from one or more peripheral regions.

In the embodiment shown in FIG. 5B, the two repeating patterns of fibers differ in the number of fibers. Embodiments of the invention are not limited in terms of the number of different repeating patterns of fibers that may be present at different areas of the fiber bundle plate. Further, embodiments of the invention are not limited in terms of the manner in which one repeating pattern differs from another. One pattern may differ from another in various ways including but not limited to the arrangement of the different length fibers, the lengths of one or more fibers, and the number of different lengths fibers. Any of the fiber bundle plates in any of the embodiments of the invention described herein may be replaced by one or more separate fiber bundle plates. They may be positioned adjacent to each other or spaced from each other, for example according to the intended purpose.

Figure 6:
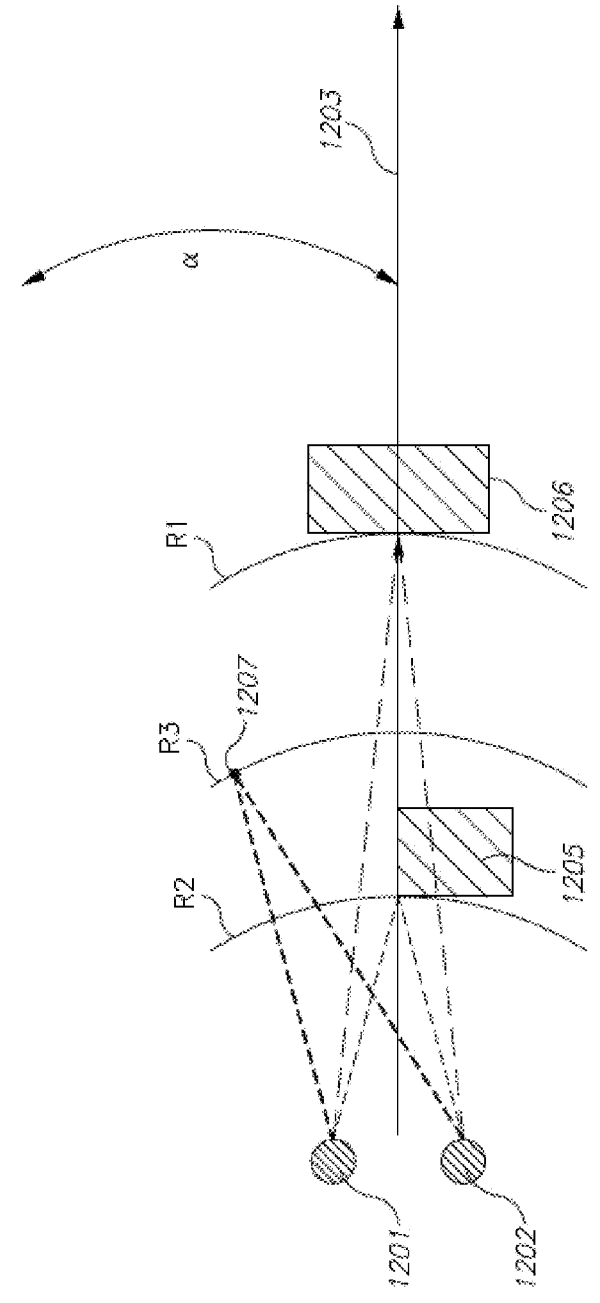
FIG. 6 is a schematic diagram illustrating determination of gaze direction and attention range according to some embodiments of the invention.

FIG. 6 is a schematic diagram illustrating the determination of gaze direction and attention range according to some embodiments of the invention. In FIG. 6, the circles 1201 and 1202 represent the eyes of a user and the arrow 1203 represents the line of sight (LOS) as might be determined by IMU 320. It should be noted here that LOS may be determined as a vector or direction. It does not determine a point on which the user's gaze is settled.

Eye tracking sensors 122 may sense movements of the eyes of the user, for example rotational movements, in order to estimate the distance at which the user's gaze is focused. This is indicated in FIG. 6 where the long-dashed lines indicate the direction of each eye and intersect at a radial distance R1 thereby suggesting that the user's attention is on object 1206. Similarly, the dotted lines indicate that the user's gaze is focused on object 1205 at a second radial distance R2.

According to some embodiments of the invention a focus of attention range may be determined from eye tracking sensor signals, which may for example define a depth of field "slice" with a maximum and minimum radius from the user. For example, it is possible to determine the distance at which a user is focusing to within a few meters. This may be sufficient to determine which one of a number of possible sites along the LOS was looked at by a user.

Eye tracking sensors may also sense movements of the eyes of a user in order to estimate the direction in which the user is looking, for example in terms of deviation from straight ahead, for example at the same time as determining attention range. This is indicated in FIG. 6 where the short-dashed lines indicate that the user's gaze is focused on a point 1207 at a radial distance R3 from the user in a direction deviating from the LOS by an angle a which is a measure of the binocular divergence. It will be apparent from FIG. 6 that determination of attention range is especially useful when the gaze direction and LOS are coincident. Where the gaze direction deviates from the LOS, measurement of gaze direction may also entail determining a focus point or range.

In practice the determination of gaze direction may be more difficult than determination of LOS because the eyes are able to move rapidly, and the gaze direction may appear to wobble. According to some embodiments of the invention, LOS data and gaze direction data may be combined to determine an "attention depth" which may define a depth of field slice in a similar manner to focus depth.

The head LOS may be determined by an independent coordinate system, for example using an IMU 320. The eye gaze direction may move with the head LOS, or it may be stabilized as a result of the vestibular ocular reflex which may cause eye movements to compensate for movements of the head. In practice, a mixture of both may take place. According to some embodiments of the present invention images may be displayed to the user in the "attention depth" slice that may be previously determined, for example as described with reference to FIG. 6. Displaying images, e.g. augmented reality images, in this limited field of view may be beneficial to the user who will not have to adjust their gaze or focus to a different region within their field of view.

Figure 7:
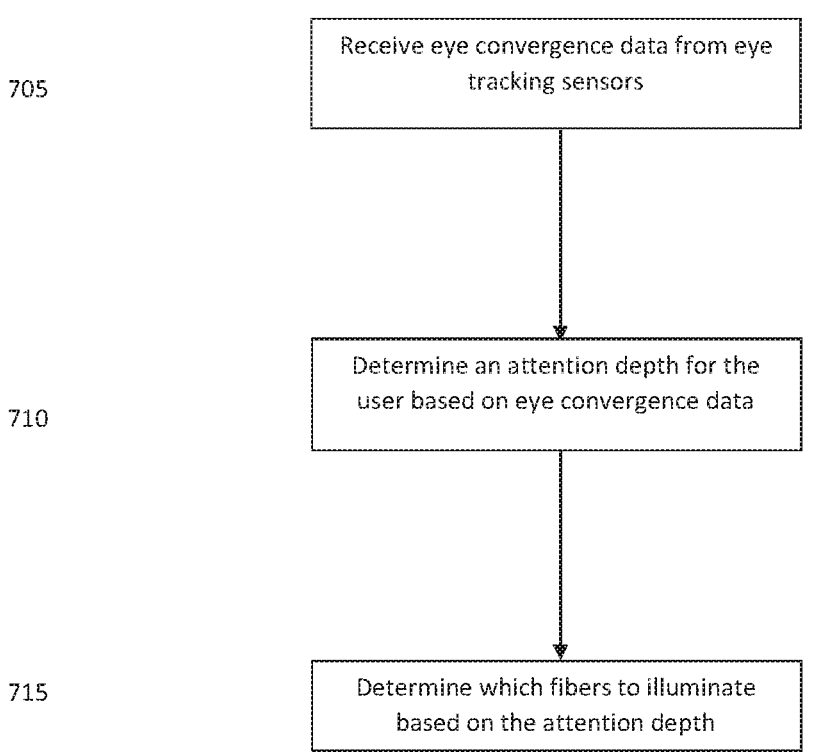
FIG. 7 is a flow chart depicting according to some embodiments of the invention.

FIG. 7 is a flow chart depicting a method of dynamically determining the distance at which an optical display system, for example any of the optical display systems disclosed herein, may focus information to be projected to a user, according to some embodiments of the invention. Such a method may result in synchronisation of the image distance and the eye tracking as illustrated in FIG. 6. The operations of FIG. 7 may be implemented in a processor contained within the controller 330 of FIG. 3. For example, via eye tracking sensors 122, eye convergence data may be received at operation 705; a measure of user attention depth may be determined, based on the eye convergence data, at operation 710; and a determination may be made as to which fibers to illuminate, based on the attention depth, at operation 715. The attention depth is the distance at which the system perceives the user to be focussing upon based on said convergence data. The controller 330 may then illuminate the fibers of corresponding length in order to display an image to the user at their attention depth. By constantly monitoring the attention depth, the processor may act to dynamically alter the distance at which a display system will focus information to be projected to a user.

A fiber bundle plate according to some embodiments of the invention may be formed by modification of a fiber bundle plate of the kind known in the art, for example by a selective etching process to create fibers of different lengths. For example, in a method according to some embodiments of the invention, a fiber bundle plate is partially masked and subjected to photolithographic etching. The method may include a number of sequential etching operations corresponding to the number of different lengths required, e.g. one etching operation may result in two different lengths of fiber and so on.

According to some embodiments of the invention, there may be provided a method of displaying images using an optical system. An example of one such method is illustrated in FIG. 8. The operations may be implemented in a processor in controller 330. The method may commence with the reception of data of one or more images to be displayed to a user at operation 805. Such data may be received from a remote source via data communication unit 325 or may have been retrieved from local storage, such as memory 323, which may be part of the optical display system.

At operation 815 the display, e.g. display 130, may be controlled to selectively illuminate pixels of the pixelated illumination array corresponding to fibers of certain lengths, based on image data received at operation 805. This may control the apparent depth at which an image corresponding to the received image data appears to the user.

For example, specific pixels 415 corresponding to fibers 420 of certain lengths may be selectively illuminated; the generated light may then be transmitted through those fibers, and further through a series of optical components such as lens 244 and reflector 248 shown in FIG. 2 at operation 810. Images may then be displayed via a lens 212 in front of the user's eyes.

In some embodiments of the invention, fibers of one length may be illuminated in only one region of the plate and fibers of a different length may be illuminated in another, separate region of the plate. In this manner, two discrete images may be displayed at different distances. According to some embodiments of the invention, a processor in an optical display system may determine the apparent depth at which an image is to be displayed to a user. This may depend on what is in the LOS of the user, which may for example be determined by image capturing device 205 in a head mounted device. Alternatively, this may depend on the user's attention depth in a method as described with reference to FIG. 7. Other methods of determining the apparent depth of an object in an image displayed to a user are possible according to embodiments of the invention. For example, image data may be received with accompanying object depth information and one example of a method using such information is described further herein with reference to FIG. 12.

According to some embodiments of the invention, an image may be displayed to a user at one of a finite number of apparent distances corresponding to the number of different lengths of fiber in the fiber bundle plate. Such an image may then appear as a two-dimensional image.

According to other embodiments of the invention, the intensity of the illumination image source may be controlled in such a way that an image of an object appears to be at a distance between the distances corresponding to the different lengths of the fibers. It is then possible to display a two-dimensional image at any apparent distance to a user. Furthermore, by controlling the intensity it is possible to display a three-dimensional image to a user.

Therefore, the flow of FIG. 8 includes an optional operation 810 of determining relative intensities of selected pixels to affect the apparent distance at which an image appears to a user. This is described in more detail with reference to FIGS. 9A and 9B.

Figure 9A:
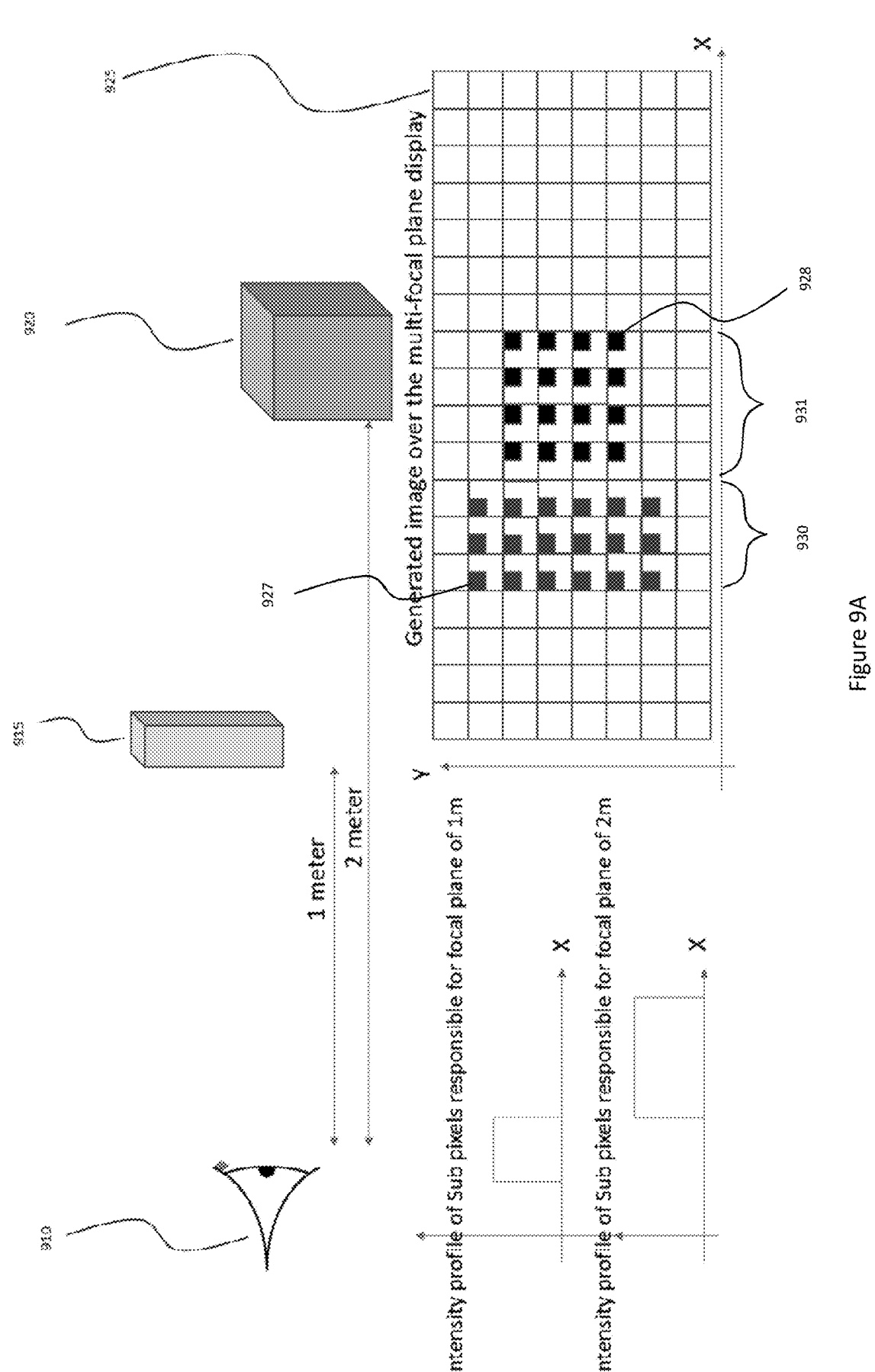
FIG. 9A illustrates schematically the display of two two-dimensional images of discrete objects to a user at different distances from the user's perspective according to some embodiments of the invention.

FIG. 9A shows two cuboidal objects 915 and 920 in front of an eye 910 of a user at distances of 1 meter and 2 meters respectively. Below this is shown a part of a display 925 according to some embodiments of the invention showing how pixels corresponding to fibers of selected lengths may be illuminated to display images of the objects 915 and 920 at different distances. In the display 925 the fibers, not shown, are arranged in groups of four different lengths with the same arrangement, or pattern, of fiber lengths in each group of four, each fiber corresponding to a pixel in the display 925. As shown, the upper left fibers 927 of each group of four have the same length corresponding to an apparent distance of 1 meter and the upper right fibers 928 have a different length from the upper left fibers corresponding to an apparent distance of 2 meters. In a first region of the display 930 shown on the left, only the upper left fibers 927 of each group of four, or only the fibers of one length, is illuminated. In a second region 931 only the upper right fibers 928 of each group, or only the fibers of one different length, are illuminated. The graphs on the left in FIG. 9A show possible intensity profiles for illuminating the pixels corresponding to the fibers. The user will see a two-dimensional image of each object at different distances from each other. It will be appreciated that the actual correspondence between fiber length and apparent distance of the projected image from the user will depend on the optical components of the optical display system described for example with reference to FIG. 2 and embodiments of the invention are not limited in this respect.

According to some embodiments of the invention, a three-dimensional image may be displayed to the user by displaying different elements of the same image at different distances to the user. In this manner, the user's brain will relate the individual elements to one another and construct a three-dimensional image.

Figure 9B:
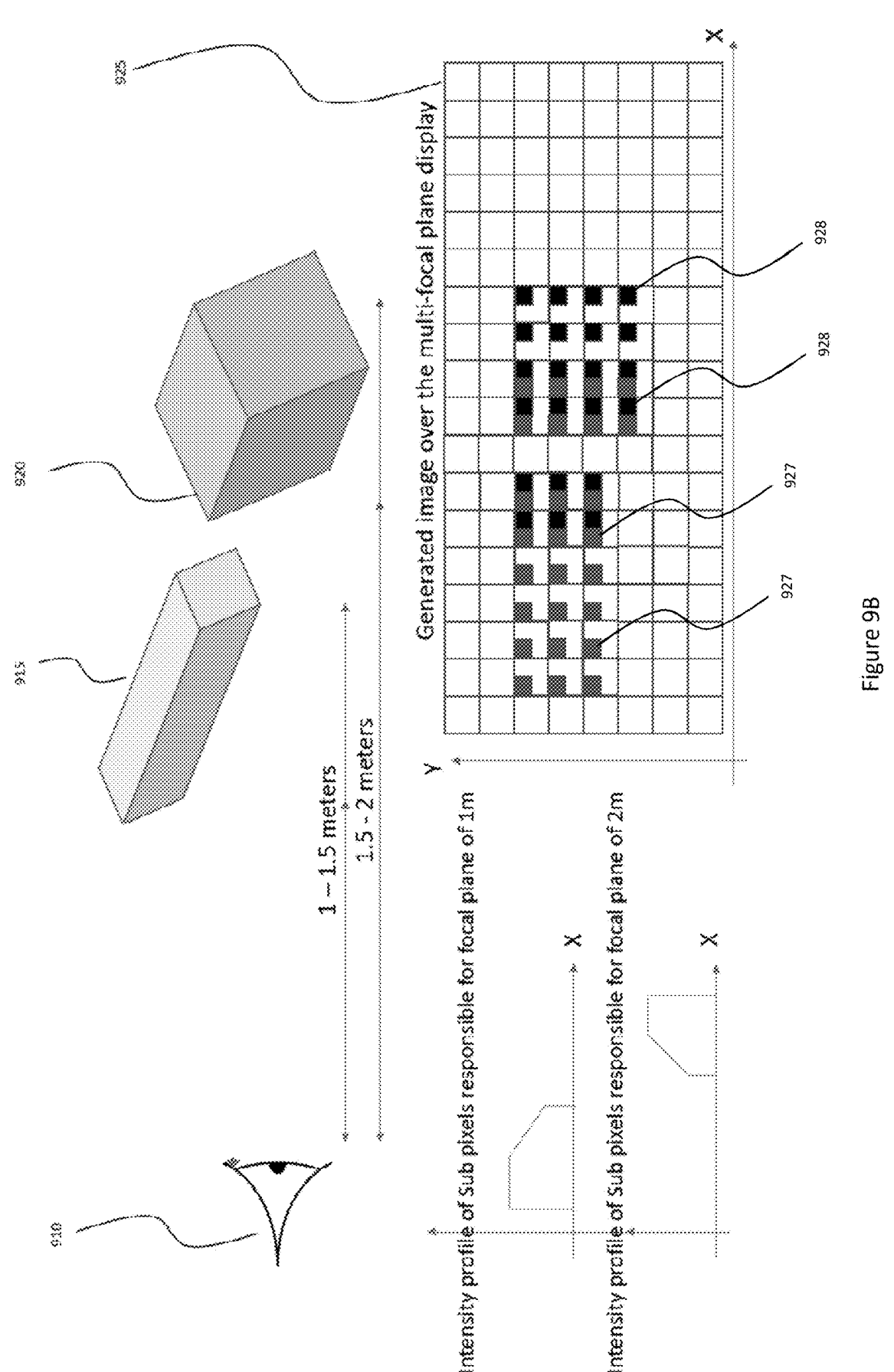
FIG. 9B illustrates schematically the display of two three-dimensional images of two objects to a user according to some embodiments of the invention.

FIG. 9B corresponds to FIG. 9A except that the user is not now viewing the two objects in elevation but in perspective view. Object 915 appears to extend from 1 to 1.5 meters from the eye 910 of the user, from left to right, and object 920 appears to extend from 1.5 to 2 meters away from the eye of the user, also from left to right. In other words, the images of the two objects are three dimensional. This may be achieved by controlling the relative intensities of illumination of the pixels corresponding to the fibers, as shown by the graphs of FIG. 9B. Taking the example of the closest object, the leftmost portion appears to be at a distance of 1 meter by illumination of fibers 927 of the same length. The rightmost portion appears to be at a distance of 1.5 meters by illumination of both "1 m" fibers and "2 m" fibers 927 and 928 at equal intensity. By illumination of fibers of two different lengths, the user is "fooled" into believing that the rightmost portion of the object is at a distance of 1.5 meters. Interpolating this effect, the perception of every distance between 1 and 1.5 meters can be achieved by choice of the relative intensities of illumination corresponding to fibers of two different lengths. The graph on the left of FIG. 9B shows how the intensity of the "1 m" pixels decreases as the intensity of the "2 m" pixels (not shown for the left object) will correspondingly increase. It will be appreciated that the image illumination intensity may depend on other factors such as but not including the colour of the image. According to some embodiments of the invention, where there are no other factors affecting the image intensity, the total illumination intensity of two fibers may be the same over the whole object and the relative intensities may determine the apparent distance at which the image appears to a user.

Figure 10:
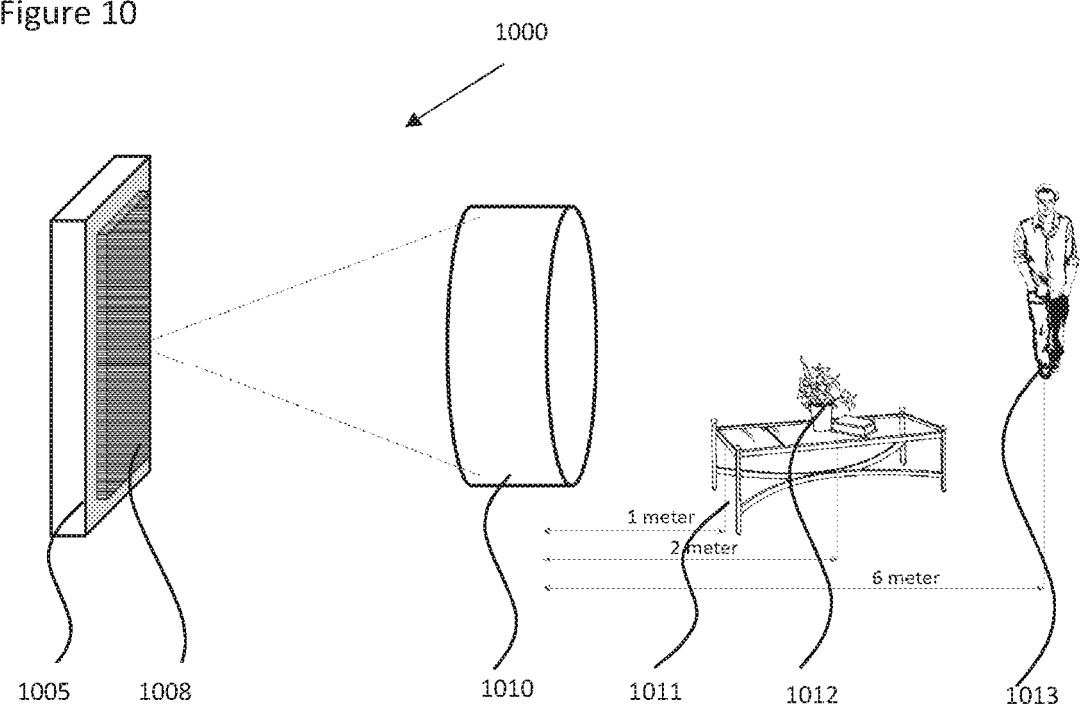
FIG. 10 illustrates an image capturing device according to some embodiments of the invention and a series of objects at varying distances from a fiber bundle plate.

A fiber bundle plate as described herein is not only useful in image displays and may have many other applications. A fiber bundle plate as described herein may be used in an image capturing device according to some embodiments of the invention. One example of such an image capturing device is illustrated in FIG. 10. FIG. 10 illustrates an image capturing device 1000 before scenery comprised of a series of objects at varying distances. The image capturing device 1000 comprises comprising a lens 1010, a fiber bundle plate 1008 and a pixelated capturing array 1005. The capturing array 1005 may be of any kind known in the art, for example of the kind commonly used in cameras, and may for example comprise an array of charge coupled devices "CCD". The fiber bundle plate 1008 may be situated between the lens 1010 and the array 1005. The fiber bundle plate may be formed of a plurality of parallel optical fibers extending in the direction of the thickness of the plate, as described elsewhere herein, and the fibers may be of at least two different lengths and arranged in a spatially sequential pattern over at least a part of the plate. The fiber bundle plate 1008 may be the same as or similar to any of the fiber bundle plates described with reference to FIGS. 4A, 4B, 5A and 5B.

In the arrangement illustrated in FIG. 10, the image capturing device 1000 faces the scenery, wherein objects 1011, 1012, and 1013 are located at increasing distances from the image capturing device.

The components of the image capturing device 1000 may be arranged such that incoming light is incident on the lens 1010 before entering the offset surface of the fiber bundle plate 1008 and then reaching the pixelated capturing device array 1005 that is adjacent to the flat surface of the plate 1008.

Some embodiments of the invention provide a method of capturing images. The image capturing device of FIG. 10 may be used in such a method. The fiber bundle plate may be used to provide information as to the distance of objects in an imaged scene with respect to the image capturing device. FIG. 11 is a flow chart depicting operations that may be involved in capturing an image, for example using a capturing device containing a fiber bundle plate as described herein. The image capturing device may be in a headset such as image capturing device 205 in headset 100 shown in FIG. 3. The image capturing device may be in any location, for example but not limited to a stationary location, for example mounted on a building or at some other fixed structure, or it may be on a moving platform of any kind. The capturing device 205 may capture an image of scenery in front of the lens 1010 at operation 1105. The remaining operations shown in FIG. 11 may be carried out at a processor, for example a processor contained within controller 330. At operation 1110, image capture data may be received at the processor from the image capturing device. The data may be analysed at operation 1115 to construct a set of two or more images. Each image may be constructed from pixels of the capturing array 1005 corresponding to fibers of the same length. In other words, not all pixels of the image capturing array 1005 may be used in the construction of images in operation 1115. A set of n images may be constructed at operation 1115 where n is an integer corresponding to the number of different lengths fibers in the fiber bundle plate. In some embodiments a complete set of n images may not be constructed. At operation 1120 comparative spatial contrast analysis may be carried out on the images obtained at operation 1115.

Operation 1120 may commence with the determination of a contrast value for each of the images constructed at operation 1115. Methods for determining contrast are known in the art and are not discussed in detail herein. One example uses the well-known Michelson contrast formula. The result of applying the formula is a numerical value, the higher the value the greater is the contrast. The determined contrast values for different images may then be compared to determine the relative distances of objects in the image from the image capturing device.

For an image containing a single object, it may be determined that the image from the n images with the highest contrast corresponds to the distance of the object from the image capturing device.

The result of the comparative spatial contrast analysis at operation 1120 may be used at operation 1125 to construct a depth map of the image. In the case of a single object the depth map may simply indicate the distance of the single object from the image capturing device. The depth map may be used in the display of an image to a user, for example in a method described with reference to FIG. 12.

In methods according to some embodiments of the invention, the comparative spatial contrast analysis may be used to determine the relative distances of multiple objects from the image capturing device, for example by determining contrast values for different areas of the set of one or more images.

According to some embodiments of the invention, a segmentation operation may be performed on the image capture data, for example at a processor in controller 330. The segmentation operation may identify objects and their location within the image in a manner known to those skilled in the art. The locations of those objects may be used to determine different areas within an image for which different contrast values may be determined to determine different distances for different objects.

In an image capturing device according to some embodiments of the invention, images constructed using different lengths of fibers may be focussed on objects at different distances from the image capturing device and may be used to determine the distance of objects from the image capturing device. According to some embodiments of the invention, it is possible to determine object distances to a greater degree of accuracy than the difference between fiber lengths, or the corresponding object distances. This may be achieved using interpolation for example. Comparative spatial contrast analysis may indicate a pattern in contrast values indicating that an object is between two focal planes corresponding to fibers of different lengths, for example if the contrast values obtained from two focal planes are similar this might indicate that the distance of the object from the image capturing device is between those focal planes. Therefore, the distance determination of operation 1115 may include determination of distances between discrete or step-wise distances corresponding to the different fiber lengths.

It should be noted here that the difference in lengths of fibers in a fiber bundle plate according to some embodiments of the invention is not equal. For example, instead of the length increasing in equal increments between the longest and the shortest, according to some embodiments of the invention the increments may be such that the shorter length fibers are closer in length to each other than the longer length fibers.

It will be appreciated that each image capture may be one frame in a series of video images. The operations of FIG. 11 may be performed on each frame. A set of n images may be obtained for each frame and a depth map may be constructed for each frame. Alternatively, a depth map may be constructed for groups of consecutive frames, for example to save on processing power, for example where there is little change between the positions of images between one frame and the next. This can be achieved using well known image processing techniques not described in detail herein.

Figure 12:
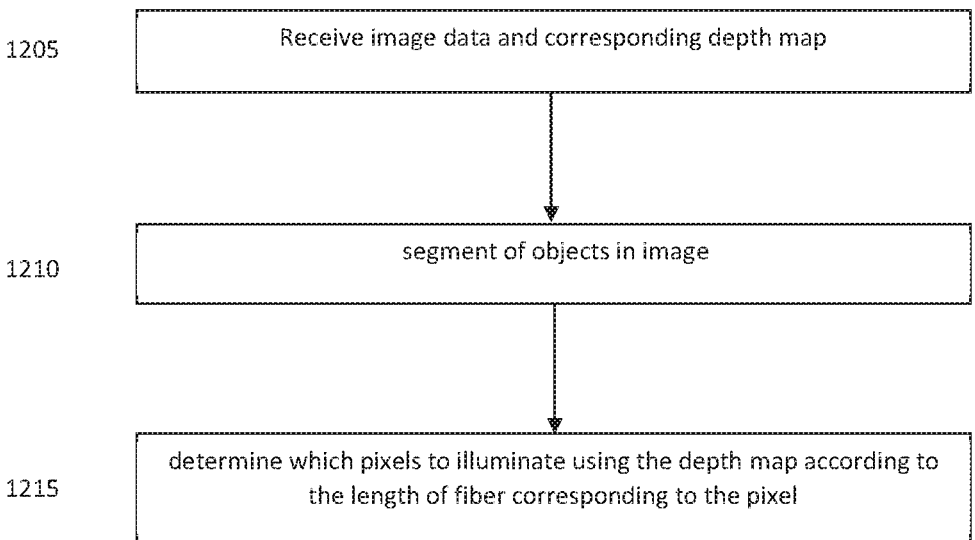
FIG. 12 is a flow chart depicting a method of displaying an image according to some embodiments of the invention.

FIG. 12 is a flow chart depicting operations that may be included in a method of displaying an image according to some embodiments of the invention. For example, the operations of FIG. 12 may be involved in constructing images at a headset. The operations of FIG. 12 may be implemented in a processor, such as a processor in a controller in a headset as described elsewhere herein. The operations of FIG. 12 are described in relation to a single image but it will be appreciated that these operations may be performed on any kinds of image including consecutive frames in a video sequence. Some of the operations of FIG. 12 may be used in a method as described with reference to FIG. 8 and some of the operations of FIG. 8 may be used in a method as described with reference to FIG. 12.

As shown in FIG. 12, for each image, image data and a corresponding depth map may be received at operation 1205. The image data may be received from any source including but not limited to a remote source such as a server of AR imagery or local storage such as a memory associated with a display. The image data may be of any kind. It may be image capture data, for example captured by an image capturing device as described herein. Alternatively, the image data maybe synthetic image data such as but not limited to computer generated imagery "CGI".

The image data and corresponding depth map may be received together at operation 1205, or separately. For example, some embodiments of the invention may comprise receiving image data and in response to receiving the image data retrieving a corresponding depth map.

At operation 1210, segmentation of objects in the scenery may be performed. According to some embodiments of the invention this segmentation may be performed using any known spatial analysis technique. According to some embodiments of the invention the segmentation may be performed using the depth map received at operation 1205. At operation 1215 it is determined which pixels of the pixelated illumination array should be illuminated to display an image to a user. The depth map may be used in the determination and the choice of pixel will be according to the fiber length corresponding to the pixel. An image for display to a user may then be constructed.

As described with reference to FIGS. 8 and 9B, operation 1215 may include determining relative intensities for selected pixels to affect the apparent distance at which an image appears to a user. Also, in order to give the illusion that an object is at a distance between the distance corresponding to different fiber lengths, two fibers in a group may be illuminated at different intensities.

According to some embodiments of the invention, a headset may comprise both an optical display and an image capturing device. A user wearing such a headset may therefore be able to both display augmented reality objects onto their environment and capture images of their surroundings, for example to be displayed on a headset, other than their own.

The invention claimed is:

1. An optical projection system comprising:
a pixelated illumination image source;
at least one fiber bundle having backward ends coupled to the pixelated illumination image source and forward ends; and
an optical arrangement comprising lenses and reflectors, the optical arrangement having a back focal plane which is located between the forward ends and a viewer,
wherein the at least one fiber bundle is formed of a plurality of parallel optical fibers extending forward from the pixelated illumination image source,
wherein the fibers are of at least two different lengths and are arranged in a first spatially sequential pattern in a first region of the at least one fiber bundle and a second spatially sequential pattern in a second region of the at least one fiber bundle different from the first region, wherein the spatially sequential patterns of the first region and the second region have different repeating patterns of fibers,
wherein the shortest fibers are located with their forward ends at the back focal plane and the longest fibers are located with their forward ends closer to the optical arrangement; and
wherein fibers of corresponding lengths to the attention depth are illuminated to display an image to the user at the user's attention depth.

2. The optical projection system of claim 1,
wherein each fiber has a first and second end,
wherein the fibers are arranged such that the first ends of the fibers are aligned is flat and the second ends of the fibers are not aligned as a result of said difference in length, and
wherein the aligned ends of the fibers face towards the pixelated illumination image source.

3. The optical projection system of claim 2, wherein the at least one fiber bundle is in the form of one or more plates and the fibers extend in the direction of the thickness of the plate.

4. The optical projection system of claim 1, wherein the fibers are arranged in at least two different spatially sequential patterns in different regions of the at least one fiber bundle.

5. The optical projection system of claim 1, wherein the fibers are arranged in a first spatially sequential pattern in a first region of the at least one fiber bundle and in a second spatially sequential pattern in a second region of the at least one fiber bundle that is different from the first region.

6. The optical projection system of claim 1, wherein the difference in length between fibers is up to 1.2 mm.

7. The optical projection system of claim 1, wherein each of the pixels of the illumination image source comprises a plurality of sub-pixels, each arranged to project light of a different color.

8. The optical projection system of claim 1, wherein the fibers are aligned with the pixels of the pixelated illumination image source in a one-to-one arrangement.

9. The optical projection system of claim 1, wherein the fibers are aligned with the sub-pixels in a one-to-one arrangement.

10. The optical projection system of claim 1, wherein the pixelated illumination image source comprises a raster scanned source.

11. The optical projection system of claim 1, integrated within a wearable device.

12. A method of displaying images using an optical projection system,
wherein the optical projection system comprises an eye tracking sensor arranged to generate eye convergence data by sensing movements of the eyes of a user thereby defining an attention depth by determining the distance and direction at which the user's eyes are focusing,
wherein the optical projection system comprises a controller comprising one or more processors configured to control the optical projection system,
wherein the optical projection system comprises a pixelated illumination source and a fiber bundle having backward ends coupled to the pixelated illumination image source, forward ends and an optical arrangement comprising lenses and reflectors, the optical arrangement having a back focal plane which is located between the forward ends and a viewer,
wherein the fiber bundle is formed of a plurality of parallel optical fibers extending forward from the source,
wherein the fibers are of at least two different lengths and are arranged in a first spatially sequential pattern in a first region of the at least one fiber bundle and a second spatially sequential pattern in a second region of the at least one fiber bundle different from the first region, wherein the spatially sequential patterns of the first region and the second region have different repeating patterns of fibers, and
wherein the shortest fibers are located with their forward ends at the back focal plane and the longest fibers are located with their forward ends closer to the optical arrangement,
the method comprising, at the controller:
receiving data of one or more images to be displayed to a user;
determining a measure of the user's attention depth based on the eye convergence data from the eye tracking sensor; and
controlling the projection system to selectively illuminate pixels of the pixelated illumination image source corresponding to fibers of certain lengths, based on said received image data to control the apparent depth at which an image corresponding to the received image data appears to the user, wherein fibers of corresponding lengths to the attention depth are illuminated to display an image to the user at the user's attention depth.

13. The method of claim 12, comprising illuminating only fibers of one length in one region of the bundle and only fibers of a different length in another region of the bundle.

14. The method of claim 12, further comprising projecting discrete two-dimensional images to the user at different regions in the field of view of the user corresponding to said different regions of the fiber bundle.

15. An image capturing device comprising a lens, a fiber bundle a pixelated capturing array and an eye tracking sensor, wherein the fiber bundle is situated between the lens and the pixelated capturing array, the fiber bundle having backward ends coupled to the pixelated capturing array and forward ends, wherein the lens has a back focal plane which is located between the forward ends and a scenery, wherein the fiber bundle is formed of a plurality of parallel optical fibers extending forward from the source, thereby forming a virtual image at said back focal plane, wherein the fibers are of at least two different lengths and are arranged in a first spatially sequential pattern in a first region of the at least one fiber bundle and a second spatially sequential pattern in a second region of the at least one fiber bundle different from the first region, wherein the spatially sequential patterns of the first region and the second region have different repeating patterns of fibers, wherein the shortest fibers are located with their forward ends at the back focal plane and the longest fibers are located with their forward ends closer to the optical arrangement, and wherein a measure of a user's attention depth is determined based on the eye convergence data from the eye tracking sensor, and wherein fibers of corresponding length to the attention depth are illuminated to display an image to the user at the user's attention depth.

16. The image capturing device of claim 15, wherein each fiber has a first and second end, and wherein the fibers are arranged such that the first ends of the fibers are aligned and such that the second ends of the fibers are not aligned as a result of said difference in length, and such that the aligned ends of the fibers face the pixelated capturing array.

17. The image capturing device of claim 15, wherein the at least one fiber bundle is in the form of one or more plates and the fibers extend in the direction of the thickness of the plate.

18. A method of capturing images using an image capturing device, wherein the device comprises a lens, a fiber bundle, a pixelated capturing device array, an eye tracking sensor, and a controller comprising at least one processor, wherein the fiber bundle is formed of a plurality of parallel optical fibers extending forward from the source, and situated between the lens and the array, the fiber bundle having backward ends coupled to the pixelated capturing array and forward ends, wherein the lens has a back focal plane which is located between the forward ends and a scenery, wherein the fibers are of at least two different lengths and are arranged in a first spatially sequential pattern in a first region of the at least one fiber bundle and a second spatially sequential pattern in a second region of the at least one fiber bundle different from the first region, wherein the spatially sequential patterns of the first region and the second region have different repeating patterns of fibers, and wherein the shortest fibers are located with their forward ends at the back focal plane and the longest fibers are located with their forward ends closer to the optical arrangement, the method comprising, at the processor:

receiving image capture data corresponding to an image captured by the pixelated capturing device array;

generating, by the eye tracking sensor, eye convergence data by sensing eye movements of the eyes of a user and defining an attention depth by determining the distance and direction at which the user's eyes are focusing;

constructing from said image capture data a set of two or more images, wherein each image is constructed from pixels of said capturing array corresponding to fibers of the same length; and performing comparative spatial contrast analysis on each image to determine the distance of one or more objects in the image from the image capturing device;

determining a measure of the user's attention depth based on the eye convergence data from the eye tracking sensor;

constructing a depth map of the captured image based on the contrast analysis; and illuminating the fibers based on the determining, thereby forming a virtual image at said back focal plane, wherein fibers of corresponding length to the attention depth are illuminated to display the image to the user at the user's attention depth.

* * * * *